Oct. 20, 1936.    F. H. POTTER ET AL    2,057,790
ELECTRICAL CONDENSER
Filed May 22, 1934
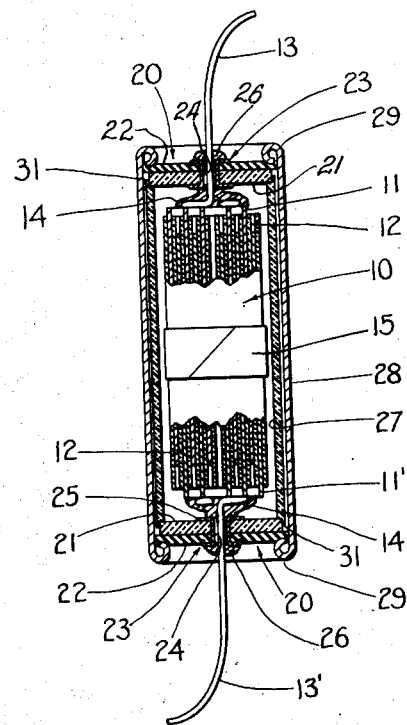
FREDERICK H POTTER
RODERICK F. MacALPINE
INVENTORS
BY Dorsey & Cole
ATTORNEYS Patented Oct. 20, 1936

2,057,790

UNITED STATES PATENT OFFICE 2,057,790

ELECTRICAL CONDENSER

Frederick H. Potter and Roderick F. MacAlpine, North Adams, Mass., assignors to Sprague Specialties Company, North Adams, Mass., a corporation of Massachusetts Application May 22, 1934, Serial No. 726,985

2 Claims. (Cl. 175—41)

Our invention relates to electrical condensers and more particularly to novel sealing means for such condensers.

As is known, the moisture-proof and air-tight enclosure of electrical condensers is of great importance for their continued proper performance, and this applies to practically all types of electrical condensers, as for instance, to wax- or oil-impregnated paper condensers and to various types of electrolytic condensers.

A large number of constructions have been suggested and are available for the air- and liquid-tight closure of such condensers.

The present invention relates to a novel construction which has the advantage of great simplicity and low cost, and is especially advantageous for mass production and with a view to standardization.

It has the further advantage that it can be used for various types of condensers, as wax- or oil-impregnated paper condensers, dry electrolytic condensers, and even wet electrolytic condensers, with no changes or with but such slight changes, as the addition of venting means for the escape of gases.

We shall describe our invention in connection with a specific embodiment thereof, as illustrated in the accompanying drawing, in which:

The figure is a vertical section of a condenser embodying our invention.

The condenser assembly 10 is shown as a conventional wax-impregnated, rolled paper condenser, but as stated above, our invention is equally applicable to other forms and types of condensers.

The condenser-roll 10 comprises two electrode foils 11—11' of tin or aluminum, which are separated in a conventional manner by single or multiple layers of impregnated insulating material 12—12. The condenser is shown as of the non-inductive type, in which one electrode foil extends beyond one end of the condenser-roll and the other electrode foil extends beyond the other end of the roll. The protruding edges of the foils 11—11' are connected to terminal leads 13—13', respectively, which may be tinned copper wires. The connection may take place as shown, by forming a hook or a coil at the inner end of the wires 13—13', which are then soldered at 14—14 to the protruding end of the respective foil 11—11'. If desired the condenser-roll may be surrounded by an adhesive wrapping 15 to prevent its unwinding.

The condenser is surrounded by an open-ended cylindrical casing 28, preferably of metal, as aluminum or copper, the two ends of which are closed by composite sealing members 20—20. As these sealing members are shown as identical on both ends of the condenser only one of them needs to be described.

The sealing member 20 consists of two circular washers, the inner washer 21 being of fiber, bakelite, or other insulating material of considerable mechanical strength and rigidity, and the outer circular washer 22 being formed of soft rubber or other resilient material, which is suitable as a gasket. The washer 22 is preferably somewhat thinner and may have a slightly larger diameter than the washer 21.

The washers 21 and 22 are provided with central apertures through which passes a cylindrical metal eyelet 23, the flanges 25—25 of which are crimped around the two washers and hold them tightly together, to form a unit. This composite sealing member comprising the stiff washer 21, the resilient washer 22, and the eyelet 23, forms a distinct unit of manufacture, which is marked by simplicity and low cost.

The terminal leads 13—13' of the condenser-roll are led through the holes 24—24 of the eyelets 23—23, whereas the free ends 29 of the metallic casing 28 are crimped inwards in a circular form around the washer 22, forming therewith an air-tight seal. Where the lead 13 emerges from the eyelet 23 it is soldered thereto, as shown at 26, the solder 26 air-tightly sealing the eyelet opening 24. At the same time the tension applied to the terminal 13, instead of being passed to the condenser-roll, is taken up by the washer assembly.

To relieve the condenser-roll from pressure due or incident to the crimping of the casing ends 29 over the resilient washer 22, we prefer to provide a cylinder 27, preferably of insulating material and of sufficient stiffness, which serves both as a vertical distance piece and as an insulator between the condenser-roll 10 and the metallic casing 28.

The washers 21—21 are thereby abutting against the cylinder 27, which is preferably shouldered, as shown at 31.

Instead of using a metallic casing which is open at both ends, one end of the casing may be closed and a single washer assembly provided. In such case the casing may serve as one electrode of the condenser, or the washer assembly may be provided with two eyelets for the passage of the two electrodes. In case of multiple condensers of course a larger number of eyelets can be provided.

The sealing means thus described are very simple, easy to manufacture, and are especially advantageous in connection with condensers of comparatively small overall dimensions and which are manufactured in mass production.

While we have described our invention with respect to a specific construction and as used for a condenser of specific type and form, we do not wish to be limited to such construction and application, but desire the appended claims to be construed as broadly as permissible in view of the prior art.

What we claim as new and desire to secure by Letters Patent is:

1. An electrical condenser comprising a condenser assembly and two terminal leads therefor, an open-ended metal casing surrounding said assembly, a sealing member at each end of said casing and comprising an inner plate of insulating material of considerable stiffness and an outer plate of soft rubber, an eyelet securing the said two plates to each other, one of each of said leads passing through said eyelet and being air-tightly soldered thereto, said open end of the casing being crimped into said rubber plate to form an air-tight seal therewith, and a rigid tubular body of insulating material disposed between the condenser assembly and the casing, said inner plate pressing against the ends of said body and being held from inward displacement thereby.

2. An electrical condenser comprising a condenser assembly and a terminal lead therefor, a cylindrical metal casing surrounding said assembly and being open at one end thereof, a sealing member at said open end of the casing and comprising an inner washer of insulating material of considerable stiffness, and an outer washer of resilient gasket material, an eyelet securing said two washers to each other, said terminal lead passing through said eyelet and being air-tightly soldered thereto, said open end of said casing being crimped into said outer washer to form an air-tight seal therewith, and a rigid cylinder of insulating material disposed between the condenser assembly and said casing, said inner washer pressing against said cylinder.

FREDERICK H. POTTER.
RODERICK F. MACALPINE.